US009335430B2

(12) United States Patent
Van Borselen et al.

(10) Patent No.: US 9,335,430 B2
(45) Date of Patent: May 10, 2016

(54) WAVE FIELD SEPARATION BY MIXED DOMAIN INVERSION (75) Inventors: Roald G. Van Borselen, Voorschoten (NL); Martijn O. Frijlink, The Hague (NL); Christina D. Riyanti, Delft (NL)

(73) Assignee: PGS GEOPHYSICAL AS, Oslo (NO)

( * ) Notice: Subject to any disclaimer, the term of this patent is extended or adjusted under 35 U.S.C. 154(b) by 825 days.

(21) Appl. No.: 13/552,611

(22) Filed: Jul. 18, 2012

(65) Prior Publication Data

US 2014/0022860 A1    Jan. 23, 2014

(51) Int. Cl.
*G01V 1/38* (2006.01)
*G01V 1/36* (2006.01)

(52) U.S. Cl.
CPC ........ *G01V 1/364* (2013.01); *G01V 2210/1293* (2013.01); *G01V 2210/1423* (2013.01); *G01V 2210/56* (2013.01); *G01V 2210/57* (2013.01)

(58) Field of Classification Search
CPC .............. G01V 1/364; G01V 2210/56; G01V 2210/57; G01V 2210/1293; G01V 2210/1423
USPC .......................................................... 367/24
See application file for complete search history.

(56) References Cited

U.S. PATENT DOCUMENTS

| 4,486,865 | A  | 12/1984 | Ruehle |
| 5,621,700 | A  | 4/1997  | Moldoveanu |
| 7,359,283 | B2 | 4/2008  | Vaage et al. |
| 2009/0251992 | A1* | 10/2009 | van Borselen et al. ......... 367/24 |
| 2011/0110189 | A1 | 5/2011 | Riyanti et al. |
| 2011/0134718 | A1* | 6/2011 | van Borselen et al. ......... 367/24 |

FOREIGN PATENT DOCUMENTS

| EP | 2 108 980 A2 | 10/2009 |
| EP | 2 330 443 A2 | 6/2011 |

OTHER PUBLICATIONS

Fokkema J.T., "Seismic Applications of Acoustic Reciprocity", Dated 1993, Elsevier Science Publishers, 352 pages.
Frijlink, Martijn, PGS, "GeoStreamer Acquisition & Processing", dated Feb. 27, 2012, 17 pages.
Borselen et al., "A Conjugate Gradient Reconstruction of Missing Offsets", PR 2.5, Downloaded Nov. 16, 2011, 4 pages, 1996.
Van Leeuwen, Laura P., "The Reconstruction of Missing Marine Seismic Data," Delft University of Technology, pp. 1-78, Aug. 2012.
European Search Report. EP Application No. EP 13 17 6940.

* cited by examiner

*Primary Examiner* — Daniel L Murphy (57) ABSTRACT

Methods, devices, and computer-readable media are provided for accessing seismic data that describes seismic energy that propagated through media, including water and optionally surface or subsurface layers, to measurement locations in the water. The seismic data includes pressure data that describes time-variant pressures at measurement locations in the water. The seismic data may also include velocity data that describes time-variant velocities of particles at measurement locations in the water. The seismic data is processed using wavefield decomposition to reduce an effect of a portion of the seismic energy that reflects off of the surface of the water. The processing is performed in a discrete domain that includes or is the measurement locations. The discrete domain may exclude certain locations or ranges of locations. The processed seismic data may be used to generate a map of any surfaces of the media through which the seismic energy propagated.

27 Claims, 4 Drawing Sheets

WAVE FIELD SEPARATION BY MIXED DOMAIN INVERSION

BACKGROUND

In the oil and gas industry, geophysical prospecting is used to aid in the search for and evaluation of subterranean formations. Geophysical prospecting techniques yield knowledge of the surface and subsurface structure of the earth, which is useful for finding and extracting valuable mineral resources, particularly hydrocarbon deposits such as oil and natural gas. One technique associated with geophysical prospecting is a seismic survey. In a marine seismic survey, a seismic signal is generated in a body of water, such as an ocean. Seismic energy sources such as water guns, air guns, and explosives are used to generate the seismic signal. Marine seismic surveys typically employ a submerged seismic source towed by a ship and periodically activated to generate an acoustic wavefield. The acoustic wavefield may be a complex wavefield that includes many different frequencies. In many cases, the seismic source consists not of a single source element, but of a spatially-distributed array of source elements.

The signal travels from the source down through the water (water layer) to the earth and possibly through sub-surfaces of the earth, where the signal is at least partially reflected by surface or subsurface seismic reflectors. Such seismic reflectors typically are interfaces between subterranean formations having different elastic properties, such as rock density, which lead to differences in acoustic impedance. Different subsurface layers may also have different attenuation and dispersion effects on the acoustic wavefield. The seismic energy is reflected back up through the water by the seismic reflectors, and the reflected seismic energy is detected and recorded by seismic sensors (also called seismic receivers, seismic recorders, or seismic detectors) such as particle velocity sensors ("geophones"), water pressure sensors ("hydrophones"), and acceleration sensors ("accelerometers") in the water layer. Seismic sensors may be deployed by themselves, but are more commonly deployed in sensor arrays. Additionally, different types of sensors, such as hydrophones and geophones, may be deployed together, such as being collocated in pairs, in a seismic survey.

In an example marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. The hydrophones and geophones may be collocated in pairs along a seismic cable.

After the reflected wave reaches a streamer cable, the wave continues to propagate to the water/air interface at the water surface, from which the wave is reflected downwardly, and is again detected by the sensors in the streamer cable. The water surface is a good reflector and the reflection coefficient at the water surface is nearly unity in magnitude and is negative in sign for seismic signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, creating spectral notches in the recorded signal and making it difficult to record data outside a selected bandwidth. Because of the influence of the surface reflection, some frequencies in the recorded signal are amplified and some frequencies are attenuated.

A vessel may tow very long streamers which have many seismic receivers attached. These receivers register a portion of a scattered acoustic wavefield originated from the sounding of a seismic source. The acoustic wavefield generated by the seismic source is scattered by subsurface reflectors and diffractors in the earth. In conventional marine seismic acquisition, the receivers of the streamer are located in array configurations at a particular depth position below the sea surface. Because of this arrangement, the so-called primary reflection, the direct response from source to subsurface and subsequently to the receivers, is clouded by the ghost reflection (signal noise), from the wave that travels from source to subsurface and subsequently via the sea surface to the receivers. The ghost reflection may be removed from marine seismic data to increase the resolving power. This procedure is known as "deghosting".

The resulting seismic data obtained in performing the survey is processed, for example, by deghosting the seismic data, to yield information relating to the geologic structure and properties of the surface or sub-surface formations in the area being surveyed. For example, the processed seismic data may be processed for display and analysis of potential hydrocarbon content of subsurface formations. Seismic data may be processed and analyzed in order to image or otherwise characterize the geologic subsurface. Accurate characterizations of the geologic subsurface may facilitate geophysical prospecting for petroleum accumulations or other mineral deposits. In order to identify locations in the earth's subsurface where there is a probability for finding petroleum accumulations, large sums of money are expended in gathering, processing, and interpreting seismic data.

An image of the structure of the earth's subsurface may be used to select locations with the greatest probability of having petroleum accumulations. To verify the presence of petroleum, a well is drilled. Drilling wells to determine whether petroleum deposits are present or not, is an extremely expensive and time-consuming undertaking. For that reason, improvements in the processing and display of the seismic data may be quite valuable for assessing the probability that an accumulation of petroleum exists at a particular location in the earth's subsurface.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. The description is organized according to the following sections:

I. OVERVIEW
II. COLLECTING SEISMIC DATA
III. DEGHOSTING BASED AT LEAST IN PART ON PRESSURE MEASUREMENTS
IV. DEGHOSTING BASED AT LEAST IN PART ON PRESSURE AND VELOCITY MEASUREMENTS
V. HARDWARE OVERVIEW
VI. EXTENSIONS AND ALTERNATIVES

I. Overview

Techniques are described herein for processing seismic data to reduce an effect of at least a portion of seismic energy that reflected off of the surface of the water. The described techniques use a mixed domain inversion approach where the processing is performed in a discrete domain of measurement locations. Although the techniques may be described with reference to specific embodiments, the functionality described herein may be provided by the performance of a method by specialized software and/or hardware operating on one or more computing devices, by a set of one or more stored instructions that, when executed, cause performance of the method, or by a set of one or more machines configured with specialized hardware and/or software to perform the method.

II. Collecting Seismic Data

Additional information about collecting and processing seismic data may be found in (1) U.S. Patent Application Publication Number 2011/0110189, filed on Nov. 12, 2009, the entire content of which is incorporated by reference herein for all purposes; (2) van Borselen, R. G., Van den Berg, P. M., and Fokkema, J. T., *A conjugate gradient construction of missing offsets*, SEG 1996, the entire content of which is incorporated by reference herein for all purposes; and (3) Fokkema, J. T., and Van den Berg, P. M. *Seismic applications of acoustic reciprocity: Elsevier.* 1993, the entire content of which is incorporated by reference herein for all purposes.

Figure 1:
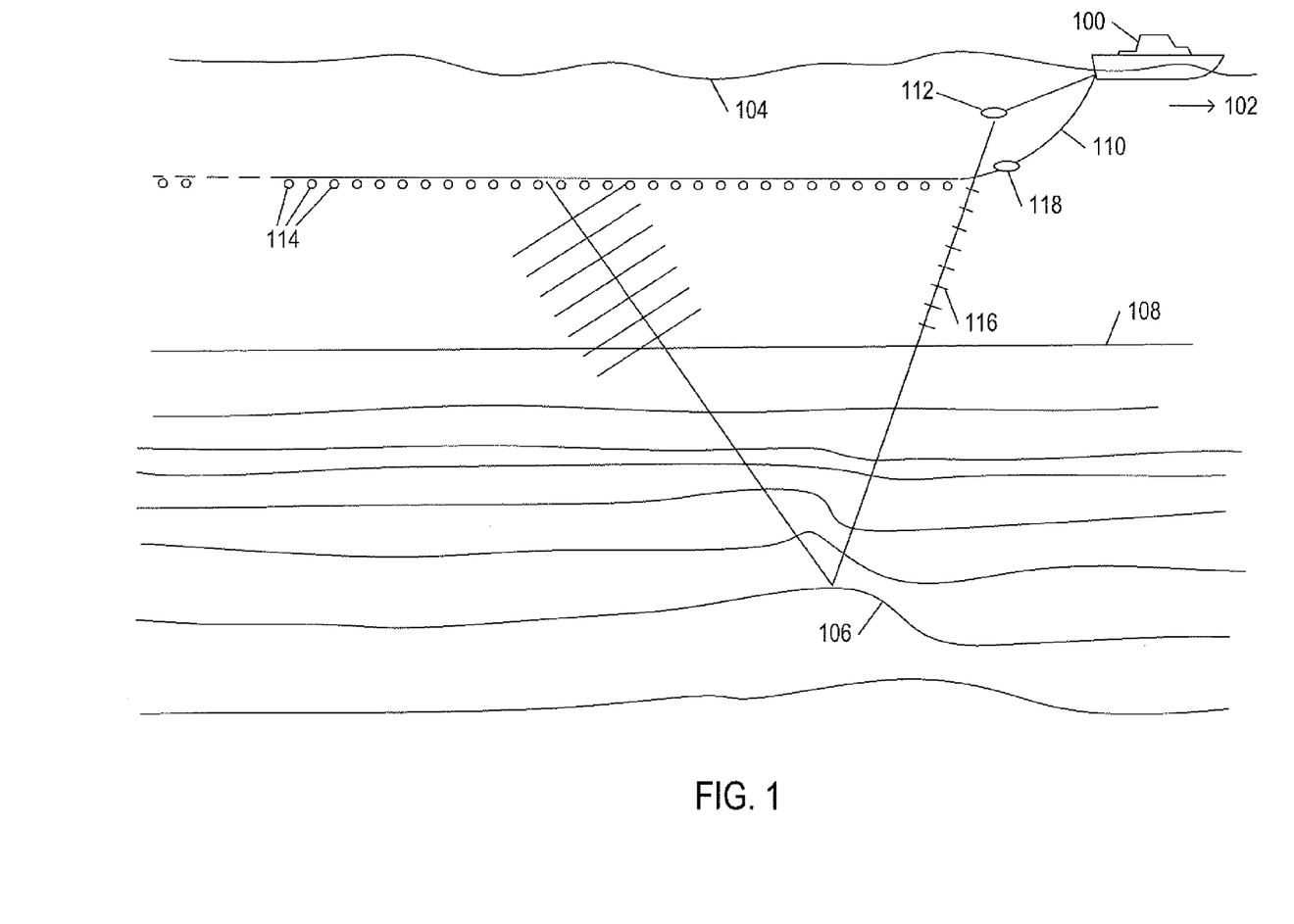
FIG. 1 depicts a specialized vessel equipped with example seismic survey equipment for collecting seismic data.

FIG. 1 depicts a specialized vessel 100 equipped with example seismic survey equipment for collecting seismic data. A seismic survey ship may deploy streamers behind the ship 100 as depicted in FIG. 1. Each streamer 110 trails behind ship 100 as the ship 100 moves forward (in the direction of arrow 102), and each streamer may include multiple receivers 114. Receivers 114 may be evenly spaced or located at non-even locations, depending upon a particular implementation. Each streamer 110 may further include one or more diverters 118 and programmable depth controllers that pull the streamer out to an operating offset distance from the ship's path and down to an operating depth.

Streamers 110 may be up to several kilometers long, and are usually constructed in sections. As one non-limiting example, a streamer 110 may include multiple sections that are 25 to 100 meters in length and that include groups of up to 35 or more uniformly spaced receivers. The number and length of sections and the number of receivers per streamer may vary, depending upon a particular implementation. Each streamer 110 may include electrical or fiber-optic cabling for interconnecting receivers 114 and the seismic equipment on ship 100. Data may be digitized near receivers 114 and transmitted to ship 100 through the cabling.

As depicted in FIG. 1, seismic survey ship 100 also tows one or more sources 112. In other embodiments, sources 112 may be towed by other source vessels, or sources 112 may be otherwise disposed in the body of water in any manner appropriate to the survey. Examples of source 112 include, without limitation, an impulse source or a vibratory source. Other types of sources 112 may be used, depending upon a particular implementation. Receivers 114 may include different types of sensors, depending upon a particular implementation. Receivers 114 may include different types of sensors, depending upon a particular implementation. Example sensors include, without limitation, hydrophones and geophones. Source 112 and receivers 114 typically deploy below the ocean's surface 104. Processing equipment aboard the ship controls the operation of the source and receivers and records the acquired data.

Seismic surveys provide data for imaging below the ocean surface 104 (also called the "upper surface" of the ocean) and include subsurface structures such as structure 106, which lies below the ocean floor 108 (also called the "lower surface" of the ocean or the "sea bottom"). Certain seismic characteristics of recorded seismic data are indicative of oil and/or gas reservoirs or other features beneath the ocean floor 108.

To image the subsurface structure 106, source 112 emits seismic waves 116 that are reflected where there are changes in acoustic impedance contrast due to subsurface structure 106 (and other subsurface structures). The reflected waves are detected by a pattern of receivers 114. By recording, among other things, the elapsed time for the seismic waves 116 to travel from source 112 to subsurface structure 106 to receivers 114, an image of subsurface structure 106 can be obtained after appropriate data processing. Data processing may include the techniques for calculating particle acceleration, velocity, and/or displacement data described above.

In one embodiment, seismic survey ship 100 includes both hydrophones and geophones and is equipped with or in communication with computing equipment for deghosting seismic data collected by the hydrophones and geophones. In another embodiment, seismic survey ship 100 includes only hydrophones and is equipped with or in communication with computing equipment for deghosting seismic data collected by the hydrophones. If seismic survey ship 100 is in communication with computing equipment, the computing equipment may be located on another vessel or on land. For example, the ship may be in wireless communication with the computing equipment over a network, such as a network that utilizes satellites or radio waves to transmit electronic signals between the seismic survey ship 100 and the computing equipment. In other embodiments, the data may be collected and recorded on survey ship 100 or elsewhere, and then later processed on land.

III. Deghosting Based at Least in Part on Pressure Measurements

In one embodiment, specially configured computing device(s) obtain seismic data that describes seismic energy that has propagated or traversed through media, including water and optionally surface or subsurface layer(s), to measurement locations in the water. The seismic data includes pressure data that describes time-variant pressures at measurement locations in the water. The computing device(s) process the seismic data using wavefield decomposition or deghosting techniques to reduce an effect of at least a portion of the seismic energy that reflected off of the (upper) surface of the water. The processing is performed in a discrete domain that includes or is the measurement locations. The processed seismic data may be used to generate a map of one or more surfaces of the media through which the seismic energy has propagated. For example, the processed seismic data may be used to generate a map of a surface of the earth and/or a subsurface of the earth.

Figure 2:
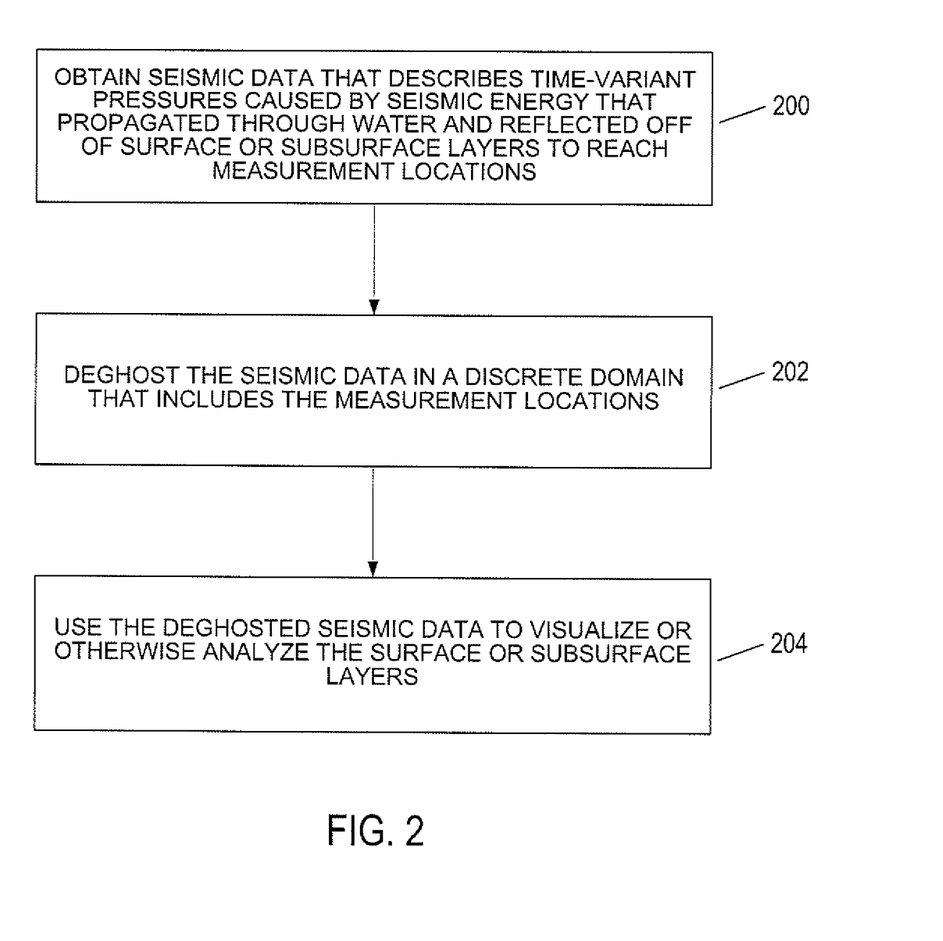
FIG. 2 is a flow chart that depicts an example computer-implemented method for deghosting seismic data based on pressure measurements.

FIG. 2 is a flow chart that depicts an example computer-implemented method for deghosting seismic data based on pressure measurements. In step 200, one or more specially configured computing devices obtain seismic data that describes time-variant pressures caused by seismic energy that propagated through water and reflected off of surface or subsurface layers to reach measurement points. For example, the computing devices may be configured to receive the seismic data from the hydrophones themselves, or from a database or other data repository that stores pressure information that was collected from hydrophones over a period of time. The seismic data may be obtained automatically without any user intervention to the sensors, the data repository, or input to the computing devices. Alternatively, the user may make various selections, settings, or other changes to the sensors, the data repository, or the computing devices as the data is collected.

In step 202 of FIG. 2 (and also step 302 of FIG. 3), the computing devices deghost the seismic data in a discrete domain that includes the measurement locations. The deghosting operation may be performed automatically without any user intervention with respect to the data obtained by the computing devices. Alternatively, the user may make various selections, settings, or other changes to optimize the deghosting operation.

In step 204 of FIG. 2 (and also step 304 of FIG. 3), the deghosted seismic data is used to visualize or otherwise analyze the surface or subsurface layers. The analysis may be performed by a human user viewing output from the computing devices. The output may include some initial automated analysis, or may include a summary of a complete automated analysis without requiring additional human analysis. For example, the automated analysis may indicate whether or not hydrocarbon or some other substance is expected to be in the measured areas. The automated analysis may also provide a likelihood of the presence of hydrocarbon or the other substance. A visualization engine operating on the computing devices may be configured to visualize, automatically or in response to user input, the deghosted seismic data by displaying a topographical map of the surface or subsurface. The data may be mapped in three dimensions with additional information displayed using colors or glyphs. The map interface may support rotation, panning, and zooming to aid in a human component of the analysis.

In one embodiment, an apparatus is specially configured to process the seismic data. The apparatus may include an interface configured to obtain the seismic data that describes seismic energy that has propagated through the water and optionally surface of subsurface layers to measurement locations in the water. The apparatus may also include a computer system including memory and processor(s) for processing the seismic data using wavefield decomposition to reduce an effect of a portion of the seismic energy that reflected off of an upper surface of the water layer. The computer system may be configured to process the seismic data in a discrete domain that includes or is the measurement locations.

In one embodiment, one or more non-transitory storage media store instructions for processing seismic data. When executed by processor(s), the instructions cause processing the seismic data to reduce an effect of at least a portion of the seismic energy that reflects off the surface of the water.

The seismic data may be processed in a discrete domain of finite measurements that excludes locations or ranges of locations at which the seismic data was not measured or is otherwise not available. For example, the discrete domain may exclude locations along gaps between active or operating sensors. In the example, if operating sensors are 10 meters apart, then locations along the 10 meters may be excluded from the discrete domain. As another example, the discrete domain may exclude locations of non-operating sensors. In the example, if the sensors are 20 meters apart, then a non-operating sensor may create a gap of 40 meters rather than 20 meters.

In one embodiment, the discrete domain includes measurement locations on one side of a source but not locations on another side of the source. For example, if the source is near a boat, the measurement locations may correspond to sensors that are being towed behind the boat while the boat is performing seismic testing. In the same or another embodiment, the discrete domain includes measurement locations beyond a threshold distance of a source but not within the threshold distance of the source. For example, sensors might not be placed too close (within a threshold distance) to the source because the dynamic range of many sensors cannot accommodate measurement of both signals that are close to the source and signals that have reflected off of the sea floor.

The techniques using a discrete domain do not require measurements to be assumed or interpolated for the other side of the boat, within a threshold distance from the boat, or for other locations that are not being measured. Therefore, using the discrete domain may avoid artifacts, which correspond to artificial measurements rather than actual measurements. The artifacts would be created when the data is transformed from the measurements (e.g. space-time) domain to a spectral domain (e.g. wavenumber-frequency), because such transformation creates artifacts if data is missing from a computation in a continuous domain. Prior techniques have assumed that all of the data was present before transformation rather than mapping only on the data that was measured.

Using a discrete domain rather than a continuous domain allows the incomplete data to be used as the reconstruction operator.

Methods of data reconstruction of missing seismic data in a discrete domain may be based on the Polya-Plancherel theorem, which states that the Fourier transform of a band-limited function is an analytic function and determined completely by the values within any finite part of the Fourier domain. More specifically, if the data is band-limited in the spatial Fourier domain, its counterpart in the spatial domain has an infinite support. Using this formulation, the missing offsets can be obtained from the data itself, without using any information about the subsurface or using any particular interpolation method. The implementation of the Polya-Plancherel theorem leads to an integral equation that can be solved using a conjugate gradient scheme. In what follows, vectors or matrices of any rank >1 are printed in bold fonts x. For example spatial coordinates are specified as $$x=(x_1,x_2,x_3)=(x_h,x_3),$$

where horizontal coordinates are specified as $x_h=(x_1, x_2)$. The forward Laplace transformation from the space-time domain $(x, t)$ to the Laplace domain $(x, s)$ is defined in general as:

$$h(x, s) = \int_{t \in \mathbb{T}} \exp(-st) \chi_{\mathbb{T}}(t) \ddot{h}(x, t) \, dt, \quad (1)$$

and the corresponding backward Laplace transformation is defined as $$\chi_{\mathbb{T}}(t) \ddot{h}(x, t) = \int_{s-j\infty}^{s+j\infty} \exp(st) h(x, s) \, ds. \quad (2)$$

Here, t is time, $j=\sqrt{-1}$ is the imaginary unit, and s is a Laplace frequency parameter. The double dotted accent in Equations (1) and (2) indicate time domain quantities. In the Laplace transformation given above in Equations (1) and (2), the Laplace parameter s, the frequency parameter, is conventionally a purely imaginary number and is defined as $$s = j\omega = j2\pi f, \quad (3)$$

where $\omega$ is circular frequency and f is real frequency. Finally the characteristic function is given by $$\chi_{\mathbb{T}} = \begin{cases} 1 & \text{for } t \in \mathbb{T}, \\ 1/2 & \text{for } t \in \partial\mathbb{T}, \\ 0 & \text{for } t \in \mathbb{T}'. \end{cases} \quad (4a)$$

Symbols in the so-called blackboard font, $\mathbb{T}$ in equations (1) to (4a), are used in equations to denote sets. The three subdomains are given by $\mathbb{T} = \{t \in \mathbb{R}; t > t_0\}$, and $\mathbb{T}' = \{t \in \mathbb{R}; t > t_0\}$ respectively; $\partial\mathbb{T}$ is the boundary of $\mathbb{T}$, while $\mathbb{T}'$ is the complement of $\mathbb{T} \cap \partial\mathbb{T}$. Later on characteristic functions similar to $\chi\mathbb{T}$ and the associated subdomains, will be used for space and the horizontal wave number domain.

Spectral notches in the recorded seismic data occur when destructive interference takes place between seismic waves with particular combinations of frequencies and wavenumbers. When the Fourier-type set of deghosting equations is solved for these frequencies f where spectral notches occur, then, the measured signal for those combinations of frequencies and wavenumbers is zero, since only background noise is recorded. When using a Laplace frequency parameter that is purely imaginary, such as defined in Equation (3) above, the inversion process becomes unstable. This instability then results in irreparable artifacts being introduced into the results of the seismic wavefield decomposition used for deghosting.

To handle the instability resulting from these spectral notches, the method of the invention employs a Laplace frequency parameter s that is a complex variable with both real and imaginary parts. Thus, the Laplace frequency parameter s is now given not by Equation (3), but by:

$$s = j\omega + \epsilon = j2\pi f + \epsilon, \quad (4b)$$

where $\epsilon$ is an additional real part of the complex Laplace frequency parameter s. In the following, the term "complex" will be used to designate that the Laplace frequency parameter has both real and imaginary parts, as in Equation (4b). This complex Laplace frequency parameter s may be used in the Laplace and spectral domain transforms and in the deghosting equations described herein.

The Fourier-type of the systems of equations mentioned in the Brief Description refers to the spatial Fourier transform defined by $$H(k_h, x_3, s) = \int h(x_h, x_3, s) \exp(jk_h \cdot x_h) d^2 x_h, \quad (5)$$

where $k_h = (k_1, k_2)$ is the horizontal wave number vector. Capital symbols like H in Equation (5) refer to wave number domain quantities. The associated inverse spatial Fourier transform is $$h(x_h, x_3, s) = \frac{1}{(2\pi)^2} \int_{k_h \in \mathbb{R}^2} H(k_h, x_3, s) \exp(-jk_h \cdot x_h) d^2 k_h. \quad (6)$$

Equation (6) is used to reconstruct h for arbitrary $x_h$ from a finite number of measurements $l=1, \ldots, L$ at the measurement locations $x_{l,h}$ for $l=1, \ldots, L$ recorded in a finite aperture at depth $x_3$, $h_l = h(x_{l,h}, x_3, s)$. Note that the index l is not tied to any direction, it is just meant to enumerate the different spatial positions. The restriction is that H is spatially band-limited. In what follows the finite aperture will be denoted by $$\mathbb{X} = \{x_h \in \mathbb{R}^2, i=1,2; x_{min,i} < x_i < x_{max,i}\}, \quad (7)$$

and H will only be nonzero for $k_h$ in $$\mathbb{K} = \{k_h \in \mathbb{R}^2, i=1,2; |k_i| < |k_{max,i}|\}. \quad (8)$$

Equation (6) and the domains like $\mathbb{X}$ and $\mathbb{K}$ as defined by equations (7) and (8) allow the problem of data reconstruction to be cast as $$\chi_{\mathbb{X}}(x_{l,h}) h(x_{l,h}, x_3, s) = \quad (9)$$

$$\frac{1}{(2\pi)^2} \int_{k_h \in \mathbb{K}} \chi_{\mathbb{K}}(k_h) H(k_h, x_3, s) \exp(-jk_h \cdot x_{l,h}) d^2 k_h,$$

With $\mathbb{T} \to \mathbb{X}$ and $\mathbb{T} \to \mathbb{K}$ equation (4a) respectively defines the characteristic functions $\chi\mathbb{X}$ and $\chi\mathbb{K}$, symbols with an overlying hat such as $\hat{\mathcal{L}}$ are used to denote integral operators. For a numerical solution of equation (9) for H, the equation is discretized. The measurements are already discrete as per equation (6), only the integral is further processed.

For convenience it is assumed that the measurement locations are uniformly sampled in both $x_1$- and $x_2$-dimensions. An efficient implementation can be set up for irregularly sampled measurement locations with a 2D version of the Nonuniform Fast Fourier Transform.

The horizontal spatial coordinates are discretized as $x_{1,q} = q\Delta x_1^R$ and $x_{2,r} = r\Delta x_2^R$ with q and r respectively taking on the N and M values $$q = -\frac{N}{2}+1, \ldots, \frac{N}{2} \text{ and } r = -\frac{M}{2}+1, \ldots, \frac{M}{2}.$$

$\Delta x_1^R$ is in-line receiver sampling distance. $\Delta x_2^R$ is cross-line receiver sampling distance. The spatial indices l, q and r can be linked according to $$l = q + \frac{N}{2} + N\left(r + \frac{M}{2}\right). \quad (10)$$

Through equation (10) each pair q, r is mapped uniquely to l, varying from 1 to NM. In what follows the value of h at measurement location $x_{l,h}=(x_{1,q}, x_{2,r})$ will be referred to as either the single index l or the pair q, r, but the equality $h_l=h_{q,r}$ holds. The $k_1$- and $k_2$-dimensions are similarly discretized by respectively N and M values;

$$k_{1,n} = n\Delta k_1 \text{ with } \Delta k_1 = \frac{2\pi}{N\Delta x_1^R} \text{ and } n = -\frac{N}{2}+1, \ldots, \frac{N}{2},$$

and $$k_{2,m} = m\Delta k_2 \text{ with } \Delta k_2 = \frac{2\pi}{N\Delta x_2^R} \text{ and } m = -\frac{M}{2}+1, \ldots, \frac{M}{2}.$$

A relation similar to equation (10) exists between the single index p and the pair n, m now based on the 2 vector expression $k_{p,h}=(k_{1,n},k_{2,m})$. The discretized representation of the wave number domain quantity H will appear in either single or dual index notation but they are again interchangeable $H_p=H_{n,m}$.

The matrix representation of the integral operator $\hat{\mathcal{L}}$ is $$\hat{\mathcal{L}}_{q,r;n,m} = \frac{\Delta k_1 \Delta k_2}{(2\pi)^2} \exp(-jk_{1,n}x_{1,q} - jk_{2,m}x_{2,r}) = \hat{\mathcal{L}}_{l;p}, \tag{11}$$

The integral equation (9) is discretized as $$h_l = \sum_{p=1}^{MN} \hat{\mathcal{L}}_{l;p} H_p. \tag{12}$$

In matrix-vector notation, equation (12) reads $$h = \hat{\mathcal{L}} H \tag{13a}$$

where both h and H are column vectors and $\hat{\mathcal{L}}$ is a matrix. Equation (12) may be solved for a given h using the Conjugate Gradient Normal Residue ("CGNR") method, an iterative scheme that is known in the field of numerical linear algebra. For later use it is noted that CGNR actually deals with the system $$\hat{\mathcal{L}}^* h = \hat{\mathcal{L}}^* \hat{\mathcal{L}} H, \tag{13b}$$

rather than equation (13a), where $\hat{\mathcal{L}}^*$ is the adjoint of matrix $\hat{\mathcal{L}}$, that is the elements of the adjoint are $\hat{\mathcal{L}}_{p;l}=(\hat{\mathcal{L}}_{l;p})^*$.

Like other Conjugate Gradient methods CGNR constructs a series of approximations $h_k$ and $H_k$ to respectively h and H such that the norm of the residual error $$r_k = h - h_k = h - \hat{\mathcal{L}} H_k \tag{14}$$

reduces in size for increasing k, $\|r_{k+1}\| < \|r_k\|$. Besides the matrix-vector multiplication in equation (13), the CGNR method also involves matrix-vector multiplications by the adjoint matrix $\hat{\mathcal{L}}^*$. The series of approximations is initiated for k=0 as $$H_0 = 0, \tag{15a}$$

$$r_0 = h. \tag{15b}$$

For the first iteration the vectors $r_1$ and $H_1$ are updated with $$g_1 = M\hat{\mathcal{L}}^* r_0, \tag{16a}$$
$$v_1 = Mg_1,$$

$$\alpha_1 = \frac{\|g_1\|^2}{\|\hat{\mathcal{L}} v_1\|^2}, \tag{16b}$$

where P is a (block-)diagonal matrix called the preconditioner. For now P is set to the identity matrix, but for joint interpolation and deghosting described in the later sections it is not.

Updating of the vectors $r_1$ and $H_1$ is done as $$H_1 = H_0 + \alpha_1 v_1, \tag{16c}$$

$$r_1 = r_0 - \alpha_1 \hat{\mathcal{L}} v_1. \tag{16d}$$

For the iterations k=2, 3, . . . the gradient is computed as $$g_k = M\hat{\mathcal{L}}^* r_{k-1}, \tag{17a}$$

$$v_k = Mg_k + \frac{\|g_k\|^2}{\|g_{k-1}\|^2} v_{k-1},$$

$$\alpha_k = \frac{\|g_k\|^2}{\|\hat{\mathcal{L}} v_k\|^2}, \tag{17b}$$

and the solution and residue vectors evolve as $$H_k = H_{k-1} + \alpha_k v_k, \tag{17c}$$

$$r_k = r_{k-1} - \alpha_k \hat{\mathcal{L}} v_k. \tag{17d}$$

When the norm of the k-th residue $\|vr_k\|$ is sufficiently small, then no more updates are applied to the data vectors. The vector $H_k$ is then taken as the approximate solution to equation (13) and is used to reconstruct h at arbitray horizontal positions $x_h$ through a discretized version of equation (6).

Next, the interpolation scheme described is modified such that it can be used for simultaneous interpolation and deghosting pressure. After marine data acquisition it is customary to remove the incident field (known as direct wave in the art) from the recordings, that is, to remove the signal that did not travel through the earth. What remains is the scattered field. Under the assumption of flat and free seasurface, scattered pressure data with receiver ghost, $P^{sct}$, and without, $P^{up}$, can be expressed in the wavenumber frequency domain as $$P^{sct}(k_h, x_3, s) = 2\sinh(s\Gamma x_3)\exp(-s\Gamma x_3)P^{up}(k_h, x_3, s) \tag{18}$$

with $$s\Gamma = \sqrt{\left(\frac{s}{c}\right)^2 + k_h \cdot k_h}, \tag{19}$$

The deghosted pressure is called $P^{up}$ as the receiver ghost is downgoing. What is more, in marine acquisition, streamers are located deeper than the sources, so the incident field may be purely downgoing. Hence the upgoing pressure $P^{up}$ might not be distinguished from the scattered part of the upgoing pressure $P^{sct,up}$.

Instead of equation (9) one may start from the integral equation that is acquired after transforming equation (18) to the spatial domain for the measurement locations $x_{l,h}$ under the restriction that the pressure is spatially band-limited to $\mathbb{K}$ $$\chi_{\mathbb{K}}(x_{l,h}) p_{sct}(x_{l,h}, x_3, s) = \qquad (20)$$
$$\frac{1}{2\pi^2} \int_{k_h \in \mathbb{K}} \chi_{\mathbb{K}}(k_h) \sinh(s\Gamma x_3) \exp(-s\Gamma x_3) P^{up}(k_h, x_3, s)$$
$$\exp(-jk_h \cdot x_{l,h}) d^2 k_h = \hat{D} P^{up}.$$

The upgoing field $P^{up}$ can be solved from equation (20) by a CGNR scheme similar to equations (15a)-(17b) with $h \rightarrow p_{sct}$ and $H \rightarrow P^{up}$, while $\hat{\mathcal{L}} \rightarrow \hat{D}$. The matrix representation of the integral operator $\hat{D}$ is closely related to that of the integral operator $\hat{\mathcal{L}}$, $\hat{\mathcal{L}}_{q,r;n,m}$ given by equation (11), $$\hat{D}_{q,r;n,m} = 2 \hat{\mathcal{L}}_{q,r;n,m} \sin h(s \Gamma_{n,m} x_3) \exp(-s \Gamma_{n,m} x_3) = \hat{D}_{l;p}. \qquad (21)$$

However, to increase the convergence rate the scheme may be preconditioned. In a diagonal preconditioner matrix, the non-zero elements are $$M_{n,m;n,m} = \left( \sum_{q=-\frac{N}{2}+1}^{\frac{N}{2}} \sum_{r=-\frac{M}{2}+1}^{\frac{M}{2}} |\hat{D}_{q,r;n,m}|^2 \right)^{-\frac{1}{2}} \qquad (22)$$
$$= M_{p;p}$$
$$= \left( \sum_{l=1}^{MN} |\hat{D}_{l;p}|^2 \right)^{-\frac{1}{2}}.$$

An intuitive explanation for the need of preconditioning is that the system matrix $\hat{\mathcal{L}} * \hat{\mathcal{L}}$ in equation (13b) is close to unity for swift convergence of the CGNR iterations. As it is a discretized Fourier Transform, $\hat{\mathcal{L}}$ is already close to unity for swift convergence of CGNR iterations, but $\hat{D}$ is not.

V. Deghosting Based at Least in Part on Pressure and Velocity Measurements

An additional element of this disclosure is another modified version of the interpolation scheme described in an earlier section, this time to be used for simultaneous interpolation and up/down separation of dual sensor data. Pressure P and vertical velocity data $V_Z$ can be transformed to the complex frequency wavenumber domain $$Q(k_h, x_3, s) = \begin{bmatrix} P \\ V_Z \end{bmatrix} (k_h, x_3, s)$$

and separate the up- and downgoing pressure, represented in the complex frequency wavenumber domain by respectively $P^{up}$ and $P^{dn}$ as $$Y = \frac{1}{2} \begin{bmatrix} 1 & -\rho/\Gamma \\ 1 & \rho/\Gamma \end{bmatrix} Q \text{ with } Y(k_h, x_3, s) = \begin{bmatrix} P^{up} \\ P^{dn} \end{bmatrix} (k_h, x_3, s). \qquad (23)$$

One can look at equation (18) as a way of composing $p_{sct}$ from $P^{up}$ and a similar view is possible for the reverse of wave field separation as per equation (23), Q=LY with $$L(k_h, x_3, s) = \begin{bmatrix} 1 & 1 \\ -\Gamma/\rho & \Gamma/\rho \end{bmatrix}. \qquad (24)$$

In seismic literature L is called the composition matrix. Analogous to equation (20) the 2*2 matrix L can be used to reconstruct the space domain 2-vector $$q(x_{l,h}, x_3, s) = \begin{bmatrix} P \\ V_Z \end{bmatrix} (x_{l,h}, x_3, s)$$

from wavenumber domain 2-vector Y, $$\chi_{\mathbb{K}}(x_{l,h}) q(x_{l,h}, x_3, s) = \qquad (25)$$
$$\frac{1}{2\pi^2} \int_{k_h \in \mathbb{K}} \chi_{\mathbb{K}}(k_h) L(k_h, x_3, s) Y(k_h, x_3, s) \exp(-jk_h \cdot x_{l,h}) d^2 k_h = \hat{L} Y.$$

Continuing the analogy with equation (20), the discretized version of equation (25) can be solved with a CGNR scheme similar to equations (15a)-(17b), where $\hat{\mathcal{L}} \rightarrow \hat{L}$, $h \rightarrow q$, and $H \rightarrow Y$. These alterations change the size of involved matrix and vectors. Each vector element is replaced by a 2 vector, $$q_l = q(x_{l,h}, x_3, s) \text{ and } Y_p = Y(k_{h,p}, x_3, s).$$

Each element of the system matrix is replaced by a 2*2 matrix $$\hat{L}_{l,p} = \hat{\mathcal{L}}_{l,p} L_p$$

with $L_p = L(k_{h,p}, x_3, s)$ and $\hat{\mathcal{L}}_p$ defined by equation (11). Similar to equation (22) the diagonal elements of the preconditioner matrix are defined by $$M_{p;p} = \left( \sum_{l=1}^{MN} \hat{L}_{l;p}^* \hat{L}_{l,p} \right)^{-\frac{1}{2}};$$

where it is noted that $M_{p;p}$ is not a scalar but a 2*2 matrix.

Figure 3:
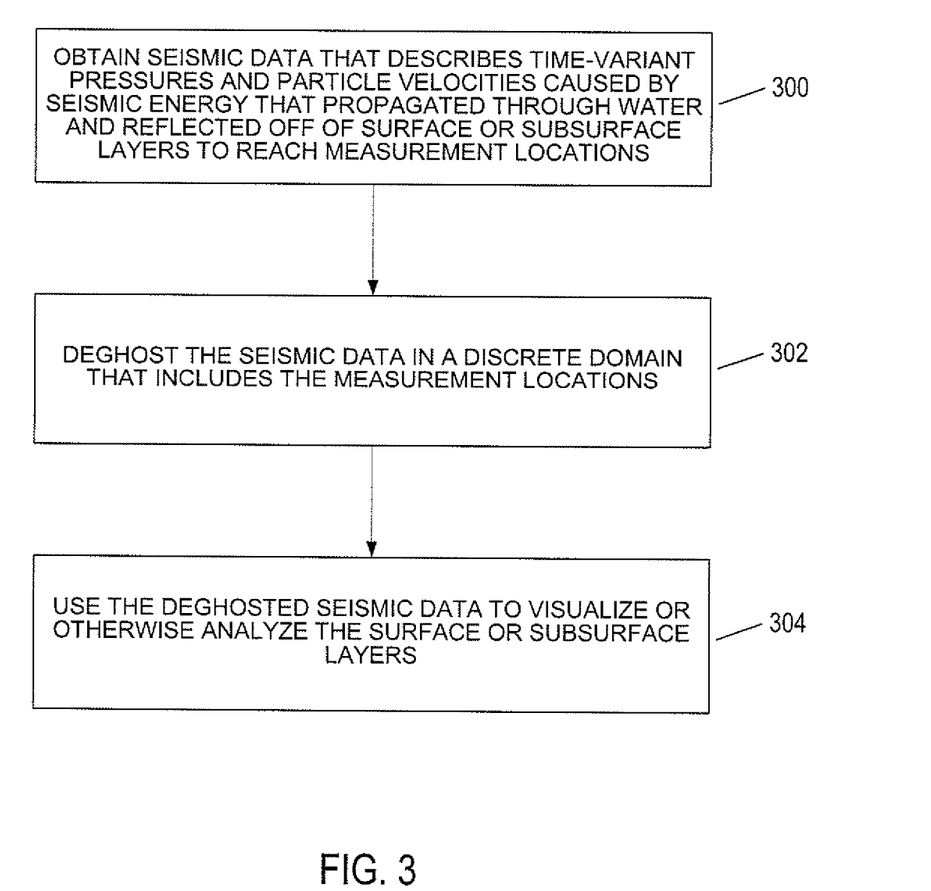
FIG. 3 is a flow chart that depicts an example computer-implemented method for deghosting seismic data based on pressure and velocity measurements.

FIG. 3 is a flow chart that depicts an example computer-implemented method for deghosting seismic data based on pressure and velocity measurements. In step 300, one or more specially configured computing devices obtain seismic data that describes time-variant pressures and time-variant particle velocities caused by seismic energy that propagated through water and reflected off of surface or subsurface layers to reach measurement points. For example, the computing devices may be configured to receive the seismic data from the hydrophones and geophones themselves, or from a database or other data repository that stores pressure information that was collected from hydrophones and geophones over a period of time. The seismic data may be obtained automatically without any user intervention to the sensors, the data repository, or input to the computing devices. Alternatively, the user may make various selections, settings, or other changes to the sensors, the data repository, or the computing devices as the data is collected. Steps 302 and 304 of FIG. 3 are similar to steps 202 and 204 of FIG. 2, except that the seismic data is deghosted using both pressure measurements and particle velocity measurements.

VI. Implementation Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, server computers or any other device that incorporates hard-wired and/or program logic to implement the techniques.

Figure 4:
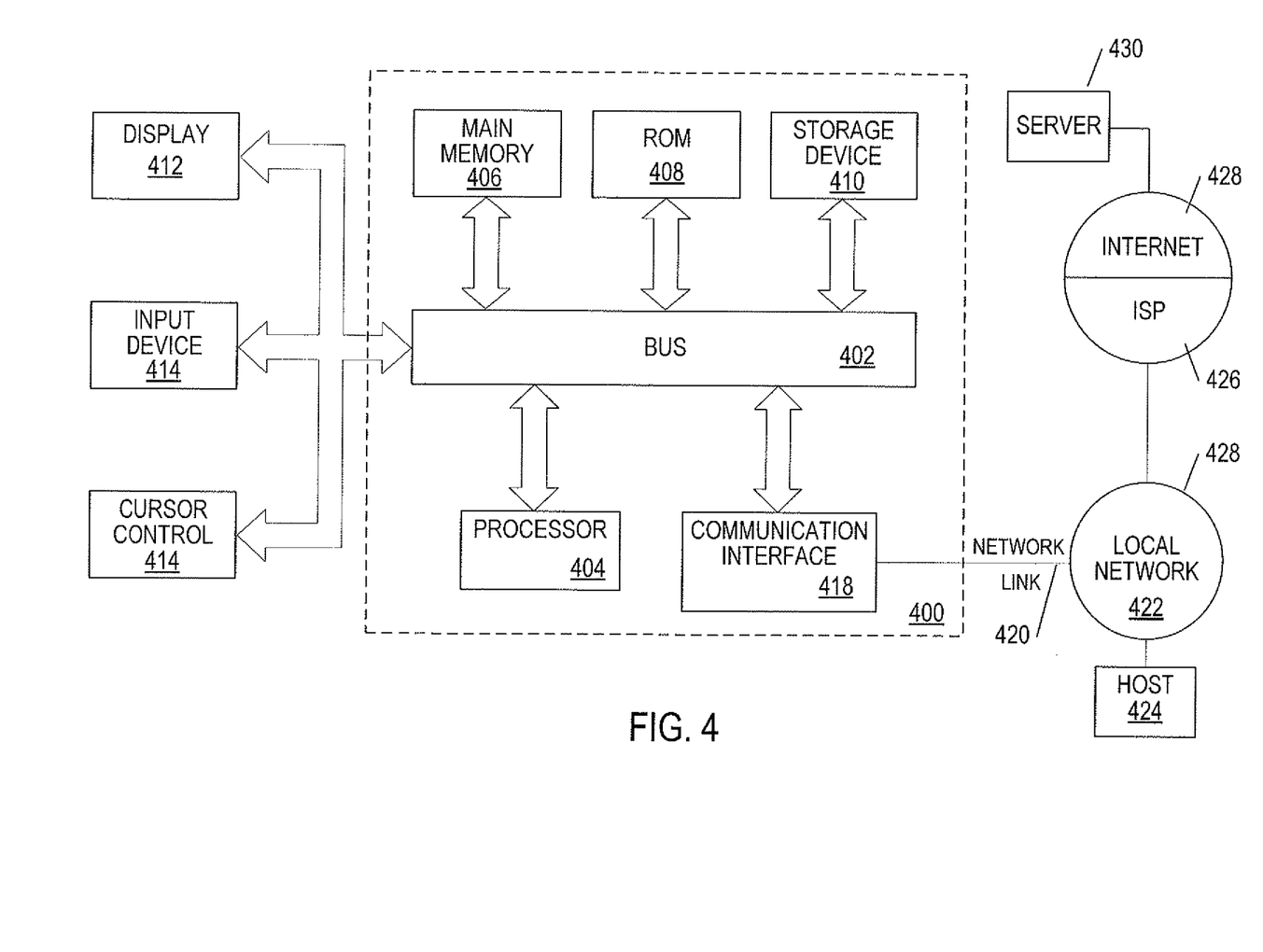
FIG. 4 depicts an example computer system for processing seismic data.

For example, FIG. 4 is a block diagram that depicts a computer system 400 upon which an embodiment of the invention may be implemented. Computer system 400 includes one or more buses 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a magnetic disk solid-state flash memory, magnetic tape or any other magnetic data storage medium, a CD-ROM or any other optical data storage medium, a PROM, an EPROM, a FLASH-EPROM or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a network. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be a network interface card, an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

VII. Extensions and Alternatives

In the examples provided, a wavefield is decomposed into up and down (ghost) components at a sensor. Similar equations can also be applied to decompose the wavefield into up and down components at the source, using equation 1 as a starting point for two or more independent measurements of the pressure wavefield, recorded at two or more different depths.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for processing seismic data, the method comprising:
   accessing the seismic data that describes seismic energy that propagated through one or more layers of media, including a water layer, to a plurality of measurement locations in the water layer,
   wherein the seismic data comprises pressure data that describes time-variant pressures at one or more of the plurality of measurement locations in the water layer;
   transforming the pressure data from a discrete space time domain to a space Laplace domain; and
   determining upgoing pressure data based on iteratively reducing a residual error that is a function of the pressure data in the space Laplace domain and an integral operator having an integrand that relates the upgoing pressure data to the pressure data in the wavenumber frequency domain,
   wherein determining the upgoing pressure data is performed in a discrete domain comprising the plurality of measurement locations, and
   wherein the method is performed by one or more computing devices.

2. The method of claim 1, wherein the seismic data comprises velocity data that describes time-variant velocities of particles at a plurality of measurement locations in the water layer.

3. The method of claim 2,
   further comprising determining upgoing pressure data and downgoing pressure data based on iteratively reducing a residual error that is a function of the pressure data and the velocity data in the space Laplace domain and an integral operator that relates the upgoing pressure data and the downgoing pressure data in the wavenumber frequency domain to the pressure data and the vertical velocity data in the Laplace domain, the integral operator given by $$\frac{1}{2\pi^2}\int_{k_h\in\mathbb{K}}\chi_{\mathbb{K}}(k_h)L(k_h, x_3, s)\begin{bmatrix}P^{up}\\P^{dn}\end{bmatrix}(k_h, x_3, s)\exp(-jk_h\cdot x_{l,h})dk_h$$

where $x_{l,h}$ is a measurement location at depth $x_3$, $\chi_{\mathbb{K}}(k_h)$ is a characteristic function of horizontal wave vectors $k_h$ in a domain of horizontal wave vectors $\mathbb{K}$, $P^{up}(k_h, x_3, s)$ is the upgoing pressure in the wavenumber frequency domain, $P^{dn}(k_h, x_3, s)$ is the downgoing pressure in the wavenumber frequency domain j is an imaginary number, L is a composition matrix, s is a complex source frequency, and $\Gamma$ is a complex vertical slowness.

4. The method of claim 1, wherein the discrete domain excludes a plurality of locations at which the seismic data was not measured, wherein the plurality of locations are caused by one or more of gaps between operating sensors at measurement locations of the plurality of measurement locations, or non-operating sensors at measurement locations other than the plurality of measurement locations.

5. The method of claim 1, wherein the one or more layers of media include a surface or subsurface of earth, further comprising using the processed seismic data to generate a map of the surface or subsurface of the earth.

6. The method of claim 1, wherein
   the integral operator further comprises $$\frac{1}{2\pi^2}\int_{k_h\in\mathbb{K}}\chi_{\mathbb{K}}(k_h)\sinh(s\Gamma x_3)\exp(-s\Gamma x_3)P^{up}(k_h, x_3, s)\exp(-jk_h\cdot x_{l,h})dk_h$$

where $x_{l,h}$ is a measurement location at depth $x_3$, $\chi_{\mathbb{K}}(k_h)$ is a characteristic function of horizontal wave vectors $k_h$ in a domain of horizontal wave vectors $\mathbb{K}$, $P^{up}(k_h, x_3, s)$ is upgoing pressure in the wavenumber frequency domain j is an imaginary number, s is a complex source frequency, $\Gamma$ is a complex vertical slowness, and $\sinh(s\Gamma x_3)\exp(-s\Gamma x_3)P^{up}(k_h,x_3, s)$ relates the upgoing pressure data to the pressure data in the wavenumber frequency domain.

7. The method of claim 1, wherein the one or more layers of media include a subsurface of earth, and wherein processing the seismic data is performed without using any information, other than the seismic data, about the subsurface of the earth.

8. An apparatus for processing seismic data, the apparatus comprising:
   logic configured to access the seismic data that describes seismic energy that propagated through one or more layers of media, including a water layer, to a plurality of measurement locations in the water layer;
   wherein the seismic data comprises pressure data that describes time-variant pressures at one or more of the plurality of measurement locations in the water layer;
   a computer system comprising a memory and one or more processors, the computer system configured to
   transform the pressure data from a discrete space time domain to a space Laplace domain; and
   determine upgoing pressure data based on iteratively reducing a residual error that is a function of the pressure data in the space Laplace domain and an integral operator having an integrand that relates the upgoing pressure data to the pressure data in the wavenumber frequency domain;
   wherein the computer system is configured to determine the upgoing pressure data in a discrete domain comprising the plurality of measurement locations.

9. The apparatus of claim 8, wherein the seismic data comprises velocity data that describes time-variant velocities of particles at a plurality of measurement locations in the water layer.

10. The apparatus of claim 9,
    further comprising the computer system to determine the upgoing pressure data and downgoing pressure data based on iteratively reducing a residual error that is a function of the pressure data and the velocity data in the space Laplace domain and an integral operator that relates the upgoing pressure data and the downgoing pressure data in the wavenumber frequency domain to the pressure data and the vertical velocity data in the Laplace domain, the integral operator given by $$\frac{1}{2\pi^2}\int_{k_h\in\mathbb{K}} \chi_\mathbb{K}(k_h)L(k_h,x_3,s)\begin{bmatrix}P^{up}\\P^{dn}\end{bmatrix}(k_h,x_3,s)\exp(-jk_h\cdot x_{l,h})\,dk_h$$

where $x_{l,h}$ is a measurement location at depth $x_3$, $\chi_\mathbb{K}(k_h)$ is a characteristic function of horizontal wave vectors $k_h$ in a domain of horizontal wave vectors $\mathbb{K}$, $P^{up}(k_h, x_3, s)$ is the upgoing pressure in the wavenumber frequency domain, $P^{dn}(k_h, x_3, s)$ is the downgoing pressure in the wavenumber frequency domain j is an imaginary number, L is a composition matrix, s is a complex source frequency, and $\Gamma$ is a complex vertical slowness.

11. The apparatus of claim 8, wherein the discrete domain excludes a plurality of locations at which the seismic data was not measured, wherein the plurality of locations are caused by one or more of: gaps between operating sensors at measurement locations of the plurality of measurement locations, or non-operating sensors at measurement locations other than the plurality of measurement locations.

12. The apparatus of claim 8, wherein the one or more layers of media include a surface or subsurface of earth, further comprising a visualization engine configured to use the processed seismic data to generate a map of the surface or subsurface of the earth.

13. The apparatus of claim 8, wherein
the integral operator further comprises $$\frac{1}{2\pi^2}\int_{k_h\in\mathbb{K}} \chi_\mathbb{K}(k_h)\sinh(s\Gamma x_3)\exp(-s\Gamma x_3)P^{up}(k_h,x_3,s)\exp(-jk_h\cdot x_{l,h})\,dk_h$$

where $x_{l,h}$ is a measurement location at depth $x_3$, $\chi_\mathbb{K}(k_h)$ is a characteristic function of horizontal wave vectors $k_h$ in a domain of horizontal wave vectors $\mathbb{K}$, $P^{up}(k_h, x_3, s)$ is upgoing pressure in the wavenumber frequency domain j is an imaginary number, s is a complex source frequency, $\Gamma$ is a complex vertical slowness, and sin h$(s\Gamma x_3)\exp(-s\Gamma x_3)P^{up}(k_h, x_3, s)$ relates the upgoing pressure data to the pressure data in the wavenumber frequency domain.

14. The apparatus of claim 8, wherein the one or more layers of media include a subsurface of earth, and wherein the computer system is configured to process the seismic data without using any information, other than the seismic data, about the subsurface of the earth.

15. One or more non-transitory computer-readable storage media storing instructions for processing seismic data which, when executed by one or more processors, cause the one or more processors to perform a method comprising:
accessing the seismic data that describes seismic energy that propagated through one or more layers of media, including a water layer, to a plurality of measurement locations in the water layer,
wherein the seismic data comprises pressure data that describes time-variant pressures at one or more of the plurality of measurement locations in the water layer;
transforming the pressure data from a discrete space time domain to a space Laplace domain; and
determining upgoing pressure data based on iteratively reducing a residual error that is a function of the pressure data in the space Laplace domain and an integral operator having an integrand that relates the upgoing pressure data to the pressure data in the wavenumber frequency domain;
wherein determining the upgoing pressure data is performed in a discrete domain comprising the plurality of measurement locations, and
wherein the method is performed by one or more computing devices.

16. The one or more non-transitory computer-readable storage media of claim 15, wherein the seismic data comprises velocity data that describes time-variant velocities of particles at a plurality of measurement locations in the water layer.

17. The one or more non-transitory computer-readable storage media of claim 16,
further comprising determining upgoing pressure data and downgoing pressure data based on iteratively reducing a residual error that is a function of the pressure data and the velocity data in the space Laplace domain and an integral operator that relates the upgoing pressure data and the downgoing pressure data in the wavenumber frequency domain to the pressure data and the vertical velocity data in the Laplace domain, the integral operator given by $$\frac{1}{2\pi^2}\int_{k_h\in\mathbb{K}} \chi_\mathbb{K}(k_h)L(k_h,x_3,s)\begin{bmatrix}P^{up}\\P^{dn}\end{bmatrix}(k_h,x_3,s)\exp(-jk_h\cdot x_{l,h})\,dk_h$$

where $x_{l,h}$ is a measurement location at depth $x_3$, $\chi_\mathbb{K}(k_h)$ is a characteristic function of horizontal wave vectors $k_h$ in a domain of horizontal wave vectors $\mathbb{K}$, $P^{up}(k_h, x_3, s)$ is the upgoing pressure in the wavenumber frequency domain, $P^{dn}(k_h, x_3, s)$ is the downgoing pressure in the wavenumber frequency domain j is an imaginary number, L is a composition matrix, s is a complex source frequency, and $\Gamma$ is a complex vertical slowness.

18. The one or more non-transitory computer-readable storage media of claim 15, wherein the discrete domain excludes a plurality of locations at which the seismic data was not measured, wherein the plurality of locations are caused by one or more of: gaps between operating sensors at measurement locations of the plurality of measurement locations, or non-operating sensors at measurement locations other than the plurality of measurement locations.

19. The one or more non-transitory computer-readable storage media of claim 15, wherein the one or more layers of media include a surface or subsurface of earth, wherein the instructions, when executed, further cause using the processed seismic data to generate a map of the surface or subsurface of the earth.

20. The one or more non-transitory computer-readable storage media of claim 15, wherein
the integral operator further comprises $$\frac{1}{2\pi^2}\int_{k_h\in\mathbb{K}} \chi_\mathbb{K}(k_h)\sinh(s\Gamma x_3)\exp(-s\Gamma x_3)P^{up}(k_h,x_3,s)\exp(-jk_h\cdot x_{l,h})\,dk_h$$

where $x_{l,h}$ is a measurement location at depth $x_3$, $\chi_\mathbb{K}(k_h)$ is a characteristic function of horizontal wave vectors $k_h$ in a domain of horizontal wave vectors $\mathbb{K}$, $P^{up}(k_h, x_3, s)$ is upgoing pressure in the wavenumber frequency domain j is an imaginary number, s is a complex source frequency, $\Gamma$ is a complex vertical slowness, and sin $h(s\Gamma x_3)\exp(-s\Gamma x_3)P^{up}(k_h, x_3, s)$ relates the upgoing pressure data to the pressure data in the wavenumber frequency domain.

21. The one or more non-transitory computer-readable storage media of claim 15, wherein the one or more layers of media include a subsurface of earth, and wherein the instructions, when executed, cause processing the seismic data without using any information, other than the seismic data, about the subsurface of the earth.

22. A method for processing seismic pressure data and seismic velocity data, the method comprising:

accessing the seismic pressure data and the seismic velocity data that describe seismic energy that propagated through one or more layers of media, including a water layer, to a plurality of measurement locations submerged in the water layer and without using artificial measurements that do not correspond to the plurality of measurement locations;

transforming the pressure data and the vertical velocity data from a discrete space time domain to a space Laplace domain; and determining upgoing pressure data and downgoing pressure data based on iteratively reducing a residual error that is a function of the pressure data and the velocity data in the space Laplace domain and an integral operator having an integrand that relates the upgoing pressure data and the downgoing pressure data to the pressure data and the vertical velocity data in the wavenumber frequency domain, wherein the method is performed by one or more computing devices.

23. The method of claim 22, wherein determining the upgoing pressure data and the downgoing pressure data is performed in a discrete domain comprising the plurality of measurement locations.

24. The method of claim 23, wherein the plurality of measurement locations forms a discrete domain that excludes a plurality of locations at which the seismic data was not measured, wherein the plurality of locations are caused by one or more of: gaps between operating sensors at measurement locations of the plurality of measurement locations, or non-operating sensors at measurement locations other than the plurality of measurement locations.

25. The method of claim 22, wherein the one or more layers of media include a surface or subsurface of earth, further comprising using the processed seismic data to generate a map of the surface or subsurface of the earth.

26. The method of claim 22, wherein the one or more layers of media include a subsurface of earth, and wherein determining the upgoing pressure data and the downgoing pressure data is performed without using any information, other than the seismic data, about the subsurface of the earth.

27. The method of claim 22, wherein the integral operator further comprises:

$$\frac{1}{(2\pi)^2} \int_{k_h \in \mathbb{K}} \chi_{\mathbb{K}}(k_h) L(k_h, x_3, s) \begin{bmatrix} P^{up} \\ P^{dn} \end{bmatrix} (k_h, x_3, s) \exp(-jk_h \cdot x_{l,h}) dk_h$$

where $x_{l,h}$ is a measurement location at depth $x_3$, $\chi_{\mathbb{K}}(k_h)$ is a characteristic function of horizontal wave vectors $k_h$ in a domain of horizontal wave vectors $\mathbb{K}$, $P^{up}(k_h, x_3, s)$ is the upgoing pressure in the wavenumber frequency domain, $P^{dn}(k_h, x_3, s)$ is the downgoing pressure in the wavenumber frequency domain, j is an imaginary number, L is a composition matrix, s is a complex source frequency, and $\Gamma$ is a complex vertical slowness.

* * * * *